US005996943A

United States Patent [19]
Gode

[11] Patent Number: 5,996,943
[45] Date of Patent: Dec. 7, 1999

[54] DEVICE AND PROCEDURE FOR UTILIZING SOLAR ENERGY MAINLY FOR PROTECTION AGAINST CYCLONES, TORNADOS, HAILS ETC.

[76] Inventor: Gabor Gode, Boszormenyi u. 3/a, H-1126 Budapest, Hungary

[21] Appl. No.: 08/601,027

[22] PCT Filed: Aug. 23, 1993

[86] PCT No.: PCT/HU93/00047

§ 371 Date: Feb. 23, 1996

§ 102(e) Date: Feb. 23, 1996

[87] PCT Pub. No.: WO95/06228

PCT Pub. Date: Mar. 2, 1995

[51] Int. Cl.[6] .................................................. B64G 1/44
[52] U.S. Cl. ........................... 244/173; 126/618; 126/685
[58] Field of Search .................... 244/158 R, 159, 244/173; 126/618, 683, 685, 698; 235/2.1

[56] References Cited

U.S. PATENT DOCUMENTS

| | | | |
|---|---|---|---|
| 3,564,253 | 2/1971 | Buckingham | 244/158 |
| 3,666,176 | 5/1972 | Carter, Jr. | 239/2.1 |
| 4,371,135 | 2/1983 | Keigler | 244/173 |
| 4,469,088 | 9/1984 | Anzai et al. | 126/436 |
| 5,238,210 | 8/1993 | Heitzmann | 244/158 R |
| 5,556,029 | 9/1996 | Griese | 239/14.1 |
| 5,593,549 | 1/1997 | Stirbl et al. | 239/2.1 |

*Primary Examiner*—Galen L. Barefoot
*Attorney, Agent, or Firm*—Young & Thompson

[57] ABSTRACT

Method and apparatus for the utilization of solar energy with collecting units that are located in geostatic orbits. The collecting units include collecting mirrors coupled to navigation units, protecting mirrors and concentrating mirrors. Mirror arrays are provided in the collecting units, the separate members of the arrays being computer controlled to concentrate solar energy toward the earth. The solar energy thus concentrated can be directed toward atmospheric disturbances to disperse them, or it can be used for the production of steam and/or electrical energy.

10 Claims, 8 Drawing Sheets

DEVICE AND PROCEDURE FOR UTILIZING SOLAR ENERGY MAINLY FOR PROTECTION AGAINST CYCLONES, TORNADOS, HAILS ETC.

Subject of the invention is a device for utilizing solar energy with collecting-radiating units located on geostatics orbit as well as a procedure for precluding from and/or alleviating of atmospherical formations i.e. tropical cyclones, tornados, monsoons causing flooding and hail.

One basic advantage of the utilization of the solar energy is that it utilizes energy free of charge and at the same time the environment is not polluted. After the oil price boom during the seventies appeared the idea of establishing devices utilizing solar energy and stationing on geosynchronized orbit around the Earth. According to one envisage ribbon mirrors would be placed on geo-synchronized orbit and these focus the solar radiation to the generating electrical energy with energy transforming devices which transform the electrical current to micro wave form and radiate to Earth. This solution has been abounded because of the difficulties of the implementation.

According to an other solution solar cells with huge surfaces would be deployed on the geo-synchronized orbit and there credating electrical current generating plantation where the electrical energy is transformed into micro wave form and it is radiated to the receivers on Earth. Basic disadvantage of this solution is that the silicon solar cells are expensive and its efficiency is very low bacause of the energy transformation with more stages as well as the diffraction of micro waves.

Solar cells are used in practice for generating electrical current requeseted to the ooperation of different satellites and devices in huge quantity moving on different geostatic orbit and course around the Earth. Silicon crystals or one unit crystal made of gallium arsenide or poly crystals are used for solar cells, and the blanks made of them are coated by translucent resistant film which protect them against the impact of the powder like micro meteorites.

The solar cells introduced above have especially high level importance in providing electrical current for the satellites on geostatic orbit because these devices mainly used for program broadcasting, telecommunication (as well as for military mission) have very extended life time period. Basic condition for this long life period functioning is the continuous energy supply which is provided by solar cells.

Despite of the fact that in the part of space out side of the atmosphere solar energy is available without limitation according to time and location as coordinates and this solar energy, with the intensity of 1.3 kW/square meter, is not influenced as it is in the case of solar energy radiated to the Earth and influenced by clouds in the atmosphere and the absorbing ability of the atmosphere this beneficial energy source is utilized on a very low level (as it was introduced before) today according to the present stage of the technical development.

Starting from that recognition that the solar energy collected by large scale mirror system located on a geostatic orbit because of the concentration ability of the sunbeams can be transferred to the receptor on the Earth with concentrated beam with low level of loss and without any polluting of the environment further the accurate setting up of the mirror system mentioned above can be established using the navigation systems developed for the satellite technology and because of this these devices are used for energy generation and/or for defense against atmospheric formation causing catastrophes.

The move of mirrors with large surface made of metallic or plastic panels with proper tensile and mirrored on one side of the surface as well as film elements with mirroring surface stretched on frame made of navigation and other type of structural elements is made by hydraulic or mechanic move mechanism launched on the geostatic orbit.

Computer with high power and controlling equipment coupled with navigation equipment radiating and absorbing laser and micro wave beams set up separately and in the proper distances from the mirror groups according to the appropriate coordinates as well on the Earth surface are used for the direction setting of the mirror system.

The direction setting and position fixing is made by rackets and auxiliary rackets mounted on the proper points of the mirror groups preferable on their holding structures' outermost surfaces. In proper way planed and implemented rackets (i.e. photon rackets) with long life operating period can be used as rackets and auxiliary rackets.

Beside the energy generating opportunity in the cosmos has not been used on the proper level for the time being as unsolved problem of the sciences and practice has remained the prevention and averting the natural catastrophes rising in the atmosphere, notwithstanding the meteorolgical researches explore the laws of natural phenomenon causing catastrophe on extending way and they make possible forecast on a certain level. The prevention and averting of this type of catastrophe as tropical tornados, cyclones etc are completely unsolved tasks.

Averting of hail is the only field where practical results are known. Two solutions are used to avert these. One solution is to block the growing of ice embryos with enforced coring. According to the other solution providing frosting cores in appropriate quantity on the right level of the appropriate storm cloud in proper time to create more embryos which increase the number of ice pieces and remove the cloud's water contain.

Starting point of the first solution is that ebryo stage is that phase where there is opportunity to influence because later during the hail formulation process when it pass the phase of embryo formulating and ice pieces having been created ready for dropping out than the chance for intervention is very low. Mainly the embryo stage raises made of "clean" over cooled water cloud. If this area containing soft ice pieces with conical shape can be deformed to cloud with mixed substance than there is chance that instead of soft ice particles huge swnow flacks are going to be developed. Low "collecting efficiency" and slow dropping speed of them supports their ascending in the steaming up as well as their coming up into the anvil. High coring speed is requested for this because ice crystals with proper dimension and with adequate number are necessary already on the 10 degree Celsius in the upside direction pipe of the hail cloud. Many snow flacks are developing in the same time which remove the water contain of the cloud on very effective way.

Calculations must be done for the estimation of the coring speed based on the grwoing speed of the ice crystals to compute the quantity of 1 cubic km of silver iodine. This requests the detailed thorough analysis of the storm cloud before the coring and it requests the direct supply of the effective substance into the active part of the cloud. It is achieved with the help of the "meso meteorolical" system mounted on the deck of an air plane. The coring with air plane is made directly under the upstream zone by the cloud's basement. It needs a very well defined upstream zone where the supply of air can be measured and which during its total life time should be thickened. Coring is more effective on higher temperature where the artifical embryos are developing and because of this by the calculation of the coring speed the decreasing of AgI efficiency. The half globe shaped "babble" of the increasing hail cloud can be extended up to the 2 kms in diameter during the penetration into the topauze and because of this more air planes implementing the coring must be deployed on the fields of upside streaming.

The essence of the second solution is as follows: removing of the water with the help of the hail's particles. This solution is coupled on stronger way the description of processes inside of the cloud and to the opportunity of the coring substances' direct penetration.

Role of the coring substance is not impeded on the ice crystals' creation but these should freeze out mainly those water drops which are large enough for launching the grow of new ice embryos. This task is solved after a survey with the support of radar with launching a racket or missile filled with AgI and drive it with using the radar to the direction of the raising zone of the hail.

Diffuse abilities of the particles are utilized by the preventive action with soil generators. It is very important to select those positions by this solution which allow to make artificial modification on technical way. Soil generator networks have been set up in some endangered areas to increase the efficiency.

Presently known methods for protection against hail have those cut backs beside their very high cost level that coherent networks have to be set up on the very extended agricultural and other type areas wanted to be protected which can not be afforded by many countries bacause their financial situation and it is not solved on technical side as well.

Any of the solution among the protecting methods dos not have 100% safety level. The reason for this is, if the hail cell forms itself on relatively quick way in this situation in the case of protection with air plane when the endangered area is in larger distance from the air base or the area is out of the range of the hail averting rackets or soil generators they are not able to stop raising of the hail or ensuing the damages.

AgI used lower (not proper) quantity for coring than it is necessary could cause—in reduced scale at least—forming of hail.

Not proper establishment of the direction of streams and intensity or the absence of adjustment to modification having happened meanwhile have impact on the result of protection.

My object is with this present invention to elaborate procedure and device which assure the economical utilization of the solar energy for preventing from as well as averting of natural catastrophes originated from the atmosphere.

I solved the task set up with device which is provided with collecting-radiating concentrating units located on geostatics orbit and with receiving units on the Earth. According to the invention the collecting-radiating units consist of collection mirror coupled to navigation units projecting mirror concentrating mirror and receiving units on the Earth contains caved heat receptors and energy generating units.

Collection mirrors and concentrating mirrors are made of mirror segments movable separately per each and the navigation units are coupled to the control centre on the Earth.

The receiving mirror on the Earth is favourable a caved heat receptor with conical shape and its inside surface is covered with pipe network. There is favourable liquid natrium circulated as heat transferring substance in the pipe network. The pipe network is coupled to a heat exchanger and energy generating unit consists of turbines as well generators.

Procedure according to the invention for precluding from and/or alleviating of atmospherical formations i.e. tropical cyclones, tornados, monsoons causing flooding and hail contains that type of steps that the collecting-radiating units located on geostatics orbit collect solar energy concentrate it than heat energy is transferred by concentrated beams to the direction of the formation and with this action the stability of the formation is going to be terminated and with this their dilution can be achieved.

Further details of the invention are shown on examples accomplished with support of drawing.

Figure 1:
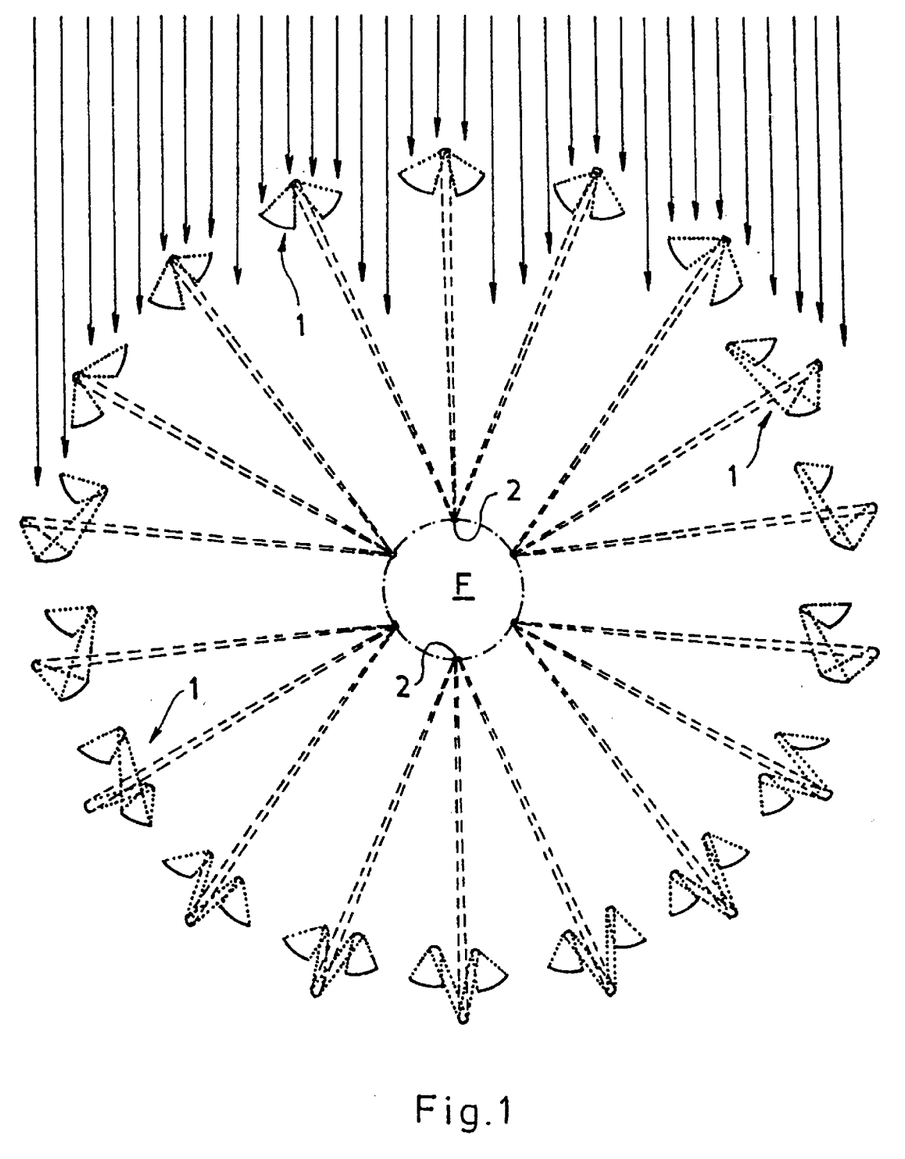
FIG. 1 shows the schematic drawing according to the invention.

The sketch of the device according to the invention can be seen on the FIG. 1. Collecting-radiating units 1 are located on the geostatic orbit around the Earth F. Sun beams are coming from the direction marked with arrows and because of this the collecting-radiating units 1 are oriented to this direction. Receiving units 2 on the Earth are on the surface of the Earth F where to the radiation arrives in concentrated form the collecting radiating units 1. Mirror groups are oriented in the most favourable direction always and they can gather the radiation with their biggest surface and to transfer it on the optimal angle direction.

Figure 2:
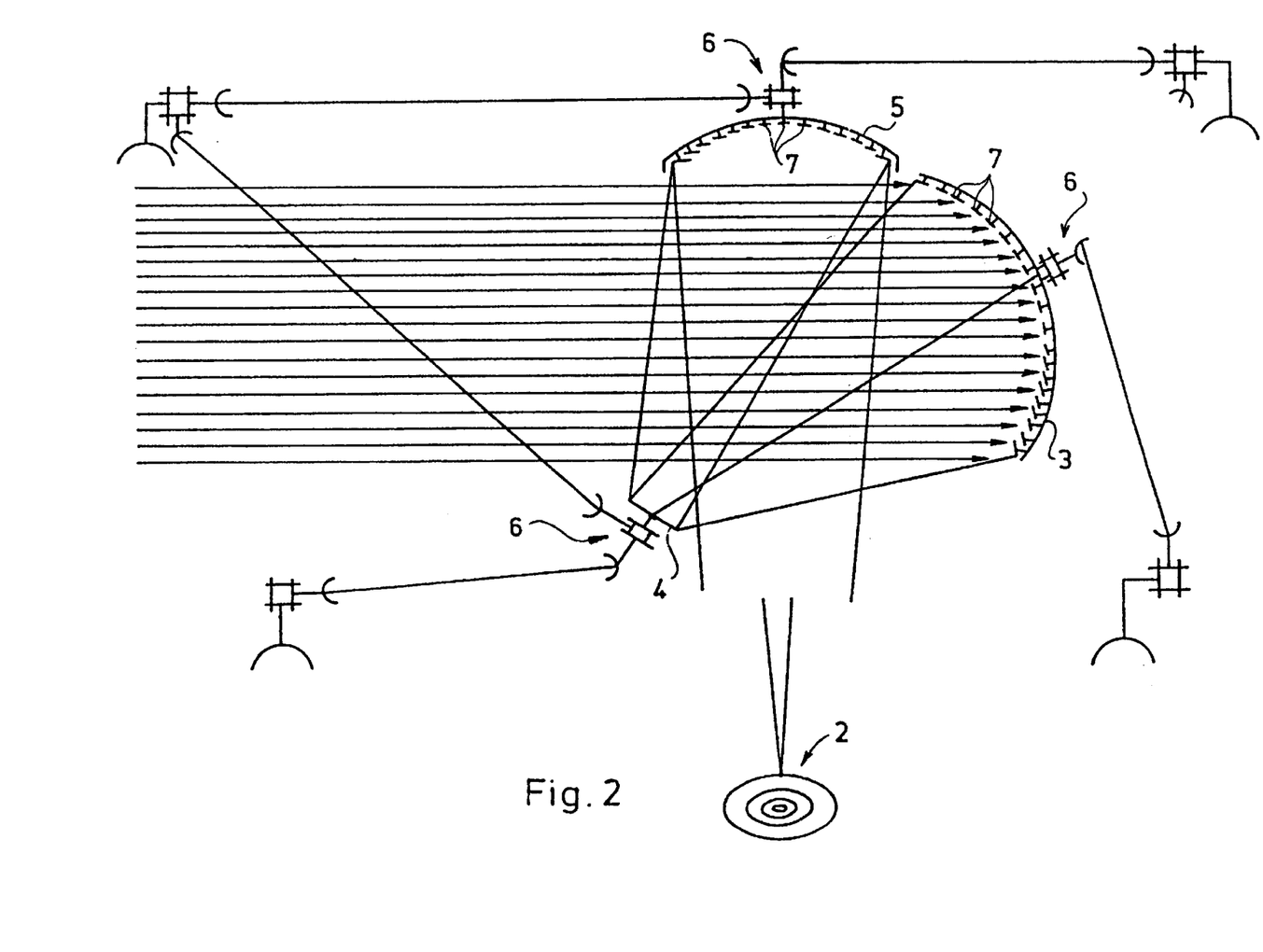
FIG. 2 is the drawing of the collecting-concentrating-radiatating unit.

The sketch of the collecting-radiating unit 1 is shown on FIG. 2. Located on the left side of the Figure collecting mirror receives the sun radiation marked with arrow and transfers it on concentrated way to projecting mirror 4 where from the beam goes further to concentrating mirrors 5. It goes from here on focused way to the receiving unit on the Earth.

The collecting-radiating unit 1 is provided with navigation unit 6. These make possible to orient in proper way the unit's mirrors namely the following of the sun and the focused radiation to the Earth.

It can be seen on the drawing as well that the collecting mirror 3 the concentrating mirror 5 are constructed of mirror segments 7 and these mirror segments 7 are separately movable as well as their synchronized movement can be established.

Figure 3:
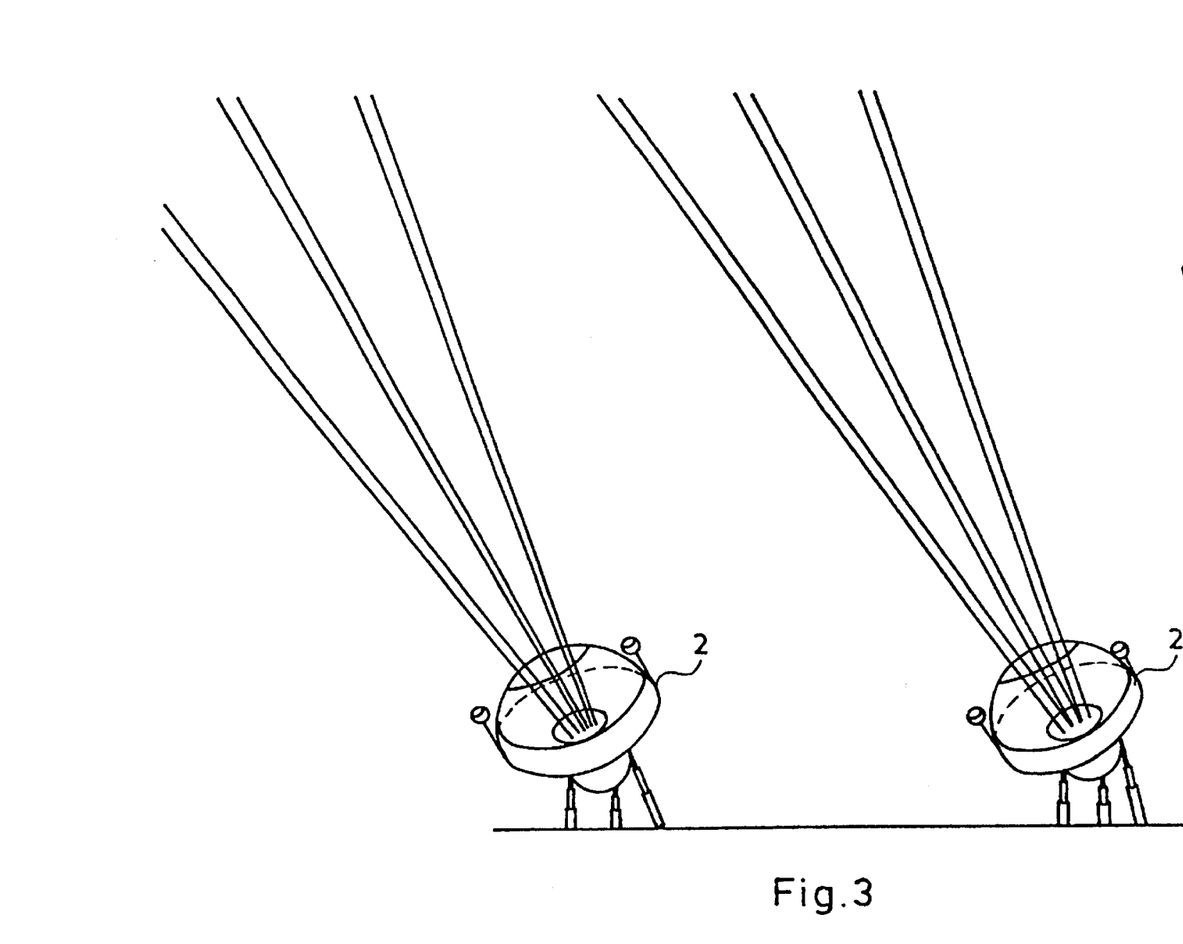
FIG. 3 is the design of the receiving unit on the Earth.
Figure 4:
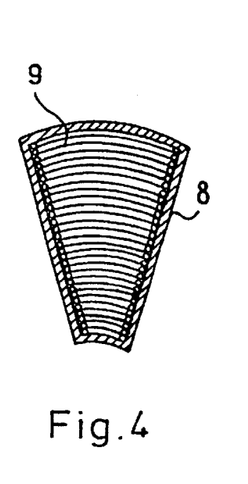
FIG. 4 shows one part in cross section of the caved equipment of the receiving unit on the Earth.
Figure 9:
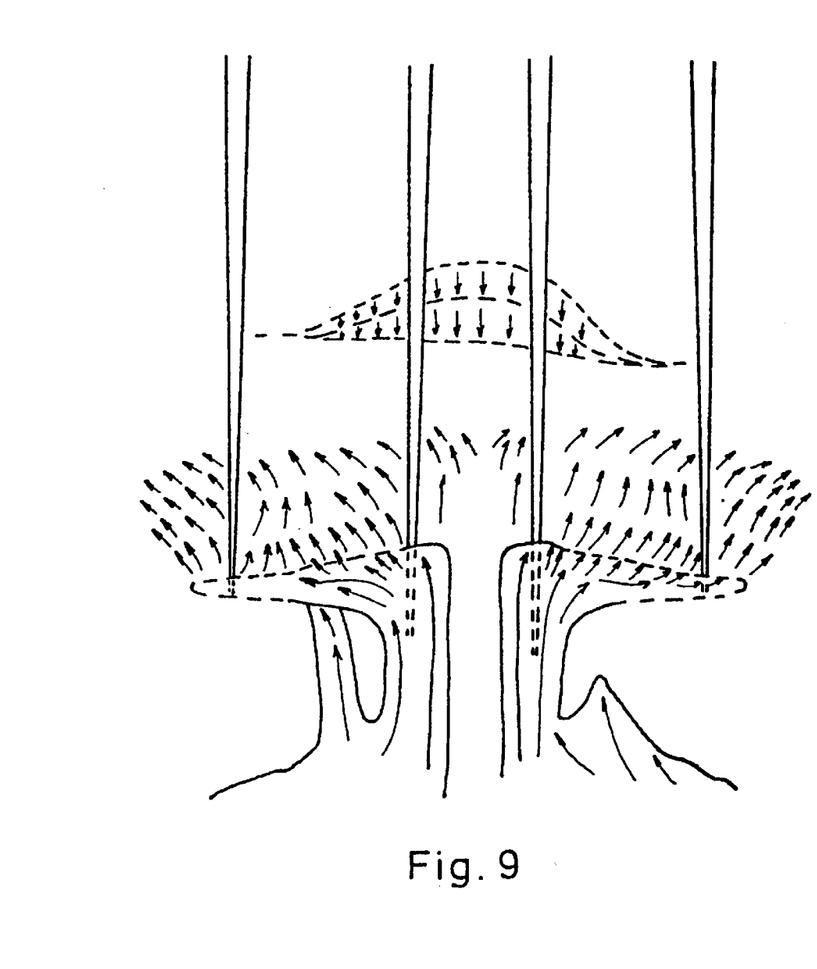
FIG. 9 shows the radiation of the erecting tropical cyclone with heat beam
Figure 10:
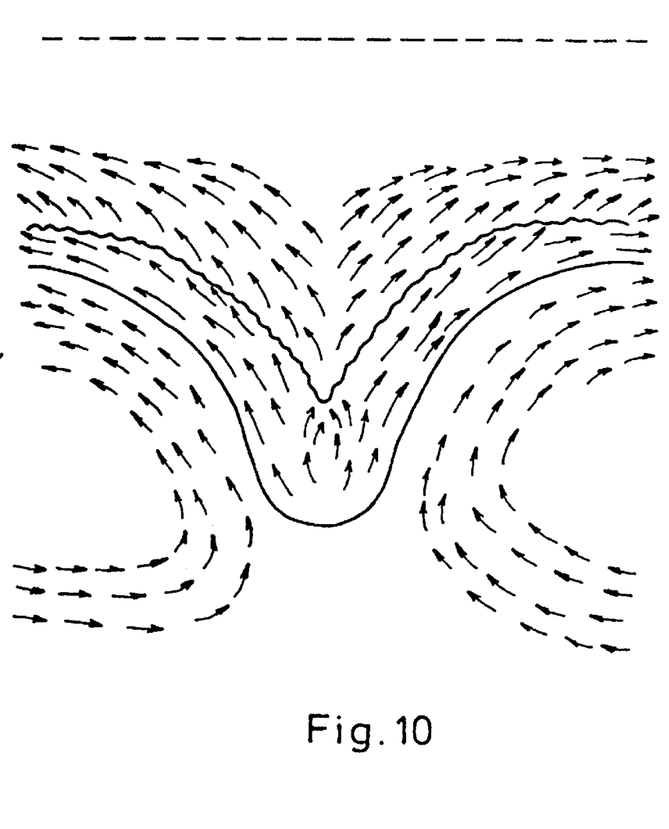
FIG. 10 shows the dilution of the cyclone because of radiating it with heat beam.

On FIG. 3 are shown the embodiment of caved heat receptor 8 of the receiving unit 1 on the Earth in which arrive the concentrated beams. Caved heat receptor 8 is shaped conical and its inside pipe network 9 shown on FIG. 9 is furnished.

The caved heat receiver 8 is coupled to a heat exchanger (because of simplicity it is not shown on the Figure). In pipe network 9 there is favourable liquid natrium as heat transferring substance and the natrium heated by the incident energy is driven into a heat exchanger where steam is created with it which steam in the energy generating units drives turbines and generators and produces electricity.

Beside producing electricity the device according to the invention can be used for precluding from and/or alleviating of meteorological formations i.e. tropical cyclones, tornados, monsoons causing flooding and hail as well as for making dilution of the developed formations.

Tropical cyclones carry formations of the atmospherical movement system as the most devastating storms of the world. For these formations developing above the warm oceanic areas is characteristic the very low surface pressure minimum, very rough winds and cloud-burst like rain. Their central core is the "eye" of the storm in which the winds are weak and the clouds are small comparatively. Developing process contain more steps. In the first phase the energy system built up from discrete storm centimes and not from continuous one and that quantity of energy surplus is piled up which is enough to achieve the layer of free convection. Their embryos develop from the convective cells having raised near the line of the tropical together-streaming zone. Energy with high level lability is compiled in the zone's of changing windsw during the calm period. The weather conditions are uncertain, there are clouds and some small rains casually but the average wind speed is low and the sea-level pressure is slowly decreasing. One push launches the up current after long waiting and the process of convection departs.

Figure 5:
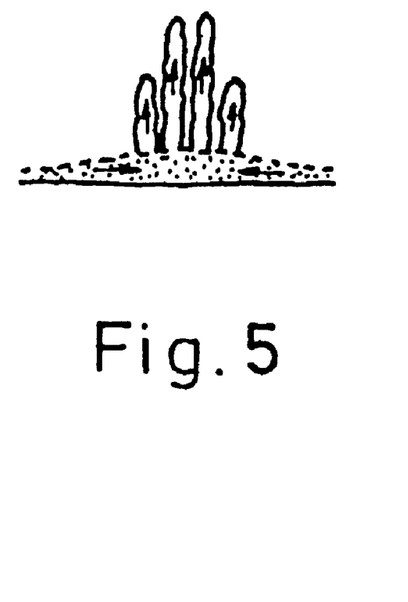
FIG. 5 shows the first stage of the erecting tropical cyclone.

There are four stages of the tropical cyclone's development. First stage can be seen on the FIG. 5 when a weak, low pressure formation appears on the sea-level and cumulonimbus towers are developing and the temperature increases slowly inside of the vertical pillars up to the troposphere. Isobar surfaces unwrap in the upper layers and air commences to cast in the upper troposphere while near the soil surface commences the influx of the warm air with high moisture contain.

Figure 6:
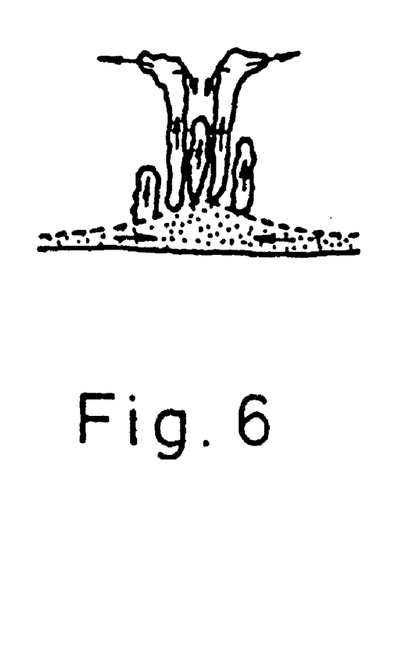
FIG. 6 shows the second stage of the erecting tropical cyclone.

The second stage is shown on FIG. 6. Here in the below layer fosters the cyclonic circulation of the influxing air and continuous cyclonic whirl develops up to the middle of the upper troposphere. Meanwhile a low pressure core develops as well which is surrounded by a high pressure ring. The air flows at first to radial direction than turning to right on anti cyclonic way out. Temperature increases more and more in the convective zone and the upside arms of spreading are extended along bigger and bigger arches because of the cyclonic circulation while down side direction current commences in the upper part.

Figure 7:
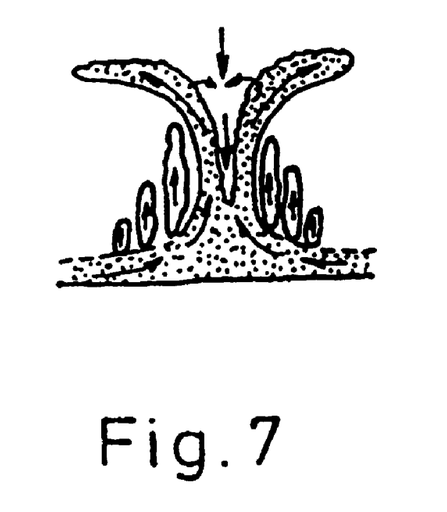
FIG. 7 shows the third stage of the erecting tropical cyclone.

In the third stage (FIG. 7.) the current becomes more ordered: influxing air below comes with higher and higher tangent speed from further distance. Menawhile the centre core is getting more wider in which the down side air movement comes lower. In the same time divergency extends to the area above the core in the troposphere turbulent mass exchange commences between the air of the developed eye and the air of the cloud's wall around it.

Figure 8:
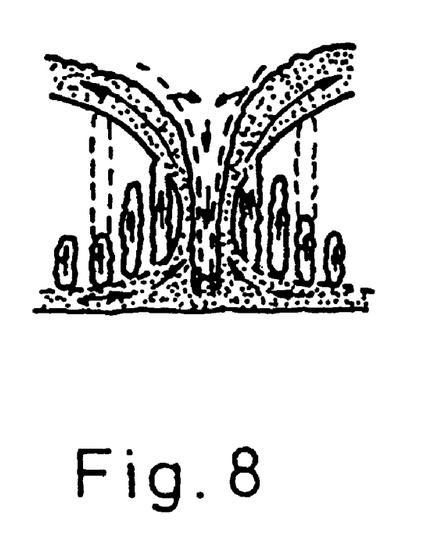
FIG. 8 shows the fourth stage of the erecting tropical cyclone.

Fourth stage of the cyclone development is shown on FIG. 8 when the vertical mass circulation to this connecting latent heat delivering as well the kinetic energy creating gets equilibrium and the temporary equilibrium of total energy and impulse momentum balance is created. Development of the tropical cyclones has two important conditions. One condition is that the wind speed difference between the wind prevailing in sufrace layers and in the upper part of the troposphere's layer in the height of 14 km must not be larger than 7 m per sec. The other condition is that in the middle of the system that type of core should develop which is warmer than its surrounding up to 10–12 km height.

Most characteristic of the tropical cyclone is that they have their cyclonic circulation influx layer below and an extending layer in the height where the out streaming air extends the Cirus chevelure in the shape of a fan. There is an external shearing line between the cyclone's movement system and the surrounding area's air which forms border zone as well and here one portion of the air streaming out from upside turning down side returns into the cyclone streaming system. The inside rainfall zone is the mixture of the most intensive rainfall and wind. There are tropical cyclones containing one and two rainfall zones.

Procedure according to the invention derives from that recognition that the disruption of the tropical cyclone's equilibrium conducts to the dilution of the cyclone. Basic condition for keeping equlibrium necessary to convention is that air influxing from the down side direction should be warm and have moisture enough while above the tropical cyclone cold "core" should be placed and the air surrounding the spreading (arms) should be at low temperature.

The natural dilution of the tropical cyclone is made by the cold surfrace of the ocean certainly (where the cyclone comes during its movement) with the disruption of the equilibrium and on the same way the dilution of cyclone can be triggered on artifical way if the air is warmed up in the Cirrus shield and Cirrus arms.

Sun beams concentrated and collected by large surface mirror systems and generated by them heat energy equivalent with more thousand MW energy is radiated to the surface of the Cirrus shield and Cirrus arms and impeding with it the convention and the temperature decreasing of the upstream of air containing moisture enough and the tropical cyclon's equilibrium is diluted. Because of the continuous heat transfer the air down side stream stops on the edges of the cyclone and with this the influx level for the supply of air mass decreases heavily. In the same time the warmed up cloud is forced to expand upwards and because of this the structure of the tropical cyclone stretching in the upward direction and it occupies a level in height where the wind speed difference is significantly larger between the paradus air mass and the influx level as 7 m per sec. The stretched cyclone cell disturbed heavily in its convection and down side stream and it is weakened and the side wind (wind shearing) destroys the cyclone cell and it leads to the total dilution of the tropical cyclone (FIG. 9.)

With this interference not only the totally developed tropical cyclone's dilution can be caused but in the stage of the raising protection can be made with good result.

In the second stage the air above the uppper ring expanding the so called cold ring can not be built up because of the warming with concentrated heat beam the upper cloud mass expanding and in the upper part of the core the down side stream does not commence.

In the third stage the dilution happens in such a way that because of warming the surrounding of the centre core with concentrated heat beams the down side stream is stopped inside of the core. Pressure around the core does not decrease with increasing the temperature of the surrounding air there is no turbulent mass exchange between the air of the eye and the air with high level of moisture belonging to the cloud's wall so there is no chance to form equilibrium the established structure elements are spoiled and the tropical cyclone before it is developed perfectly and it gets its final form it dilutes.

In the whirlwind class tornado means the biggest and most destroying formation what mainly in the area of the Mississippi is very frequent. This formation is mainly with vertical axel and it is comparatively big formation mainly with funnelling form and destroying power. Partial vacuum is created in the middle of them by the centrifugal force impacting on the quick spiral stream. If the low end of the whirlwind touches the Earth's surface its track of destroy is about 10–15 m wide at least or in the case of a tornado it can be one and the half kilometre wide as well.

Figure 11:
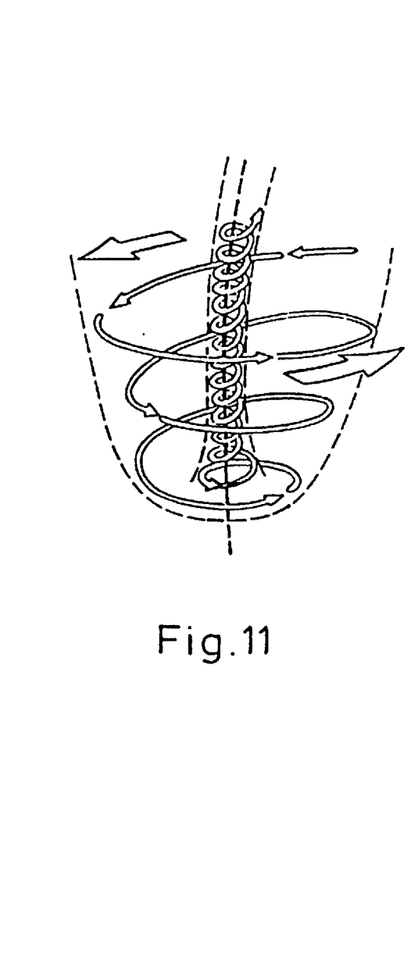
FIG. 11 shows the double streaming system of the tornado.

Tornado is formed via more characteristic shapes. Before appearing its first form dark storm cloud with green yellow colours covers the sky the wether is stormy and maybe some hail can be recognised. The lower part of the clouds has "mamma" character than dark bulging appear on it which converge to one direction and in one point they unify and the air sack is developed which forms gradually funnel than it is shaped as a trunk. When the funnel riches the "Earth" bush made of dust and rubbish appears than the low part of the funnel the very characteristic hour-glass appears. In the same time with this from the near distance locomotive like noise and from larger distance murmur can be heard. With its getting strong further with bulging its upper part it shapes like a chalice. In this time an invisible cloak spiralling downward appears around the funnel spiralling upwards which downward spiral surrounds the widening upper part of the funnel (FIG. 11).

Moving speed of the raising tornado is about 6–30 m per sec. when the spiral movement in the wall of the funnel in horizontal direction is 20–100 m per sec. and the vertical component is 20–80 m per sec. Their appearing place is the valley of the Mississippi and beside this an other frequent appearing place is the south part of Australia but during the summer period they could be found everywhere except the tropical zone.

They raise in such away that above warm and moisture air layer there are weak inversion than dry adiabatic stratification with instable cold any dry layer are located. Because the two types of air layers are seperated by weak inversion nothing happens here at the beginning. But in that case if the inversion is broken through from any reason explosion like upstream comes. It can happen on two ways. According to one variation waving starts because of horizontal wind sharing along the super cell's pseudo cold fron braking advance from an approaching cold front and this results formations of snapping off whirls. If one snapping off whirl with vertical axel is drifted into that area where the stratification of the two air mass is located above each others than this results the raising of tornado.

According to the other variation if any where along the frontal wind sharing intensive upstream starts from any reason opposite current are sucked inside and with this approach each other and on this base a whirl is created with vertical axel. The wall of the whirl closes on dynamical way because of the centrifugal forth new air can come in into the flue only from the lower end. The revolving speed of this air moving spiral way from the outside wall of the whirl from and coming in from outside upside to downward is increased enormously to keep the impulse momentum.

Figure 12:
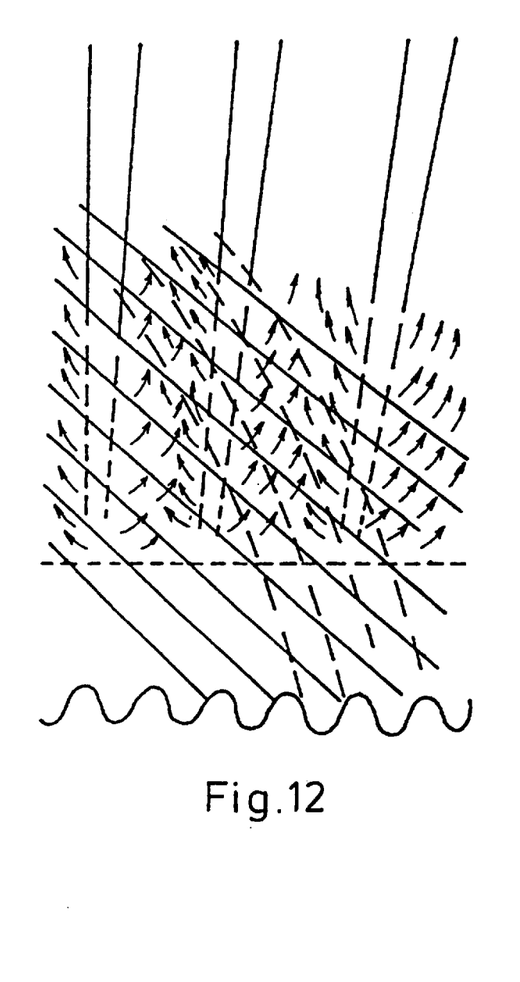
FIG. 12 shows the radiation of stratum's formation before the erecting of tornado.
Figure 13:
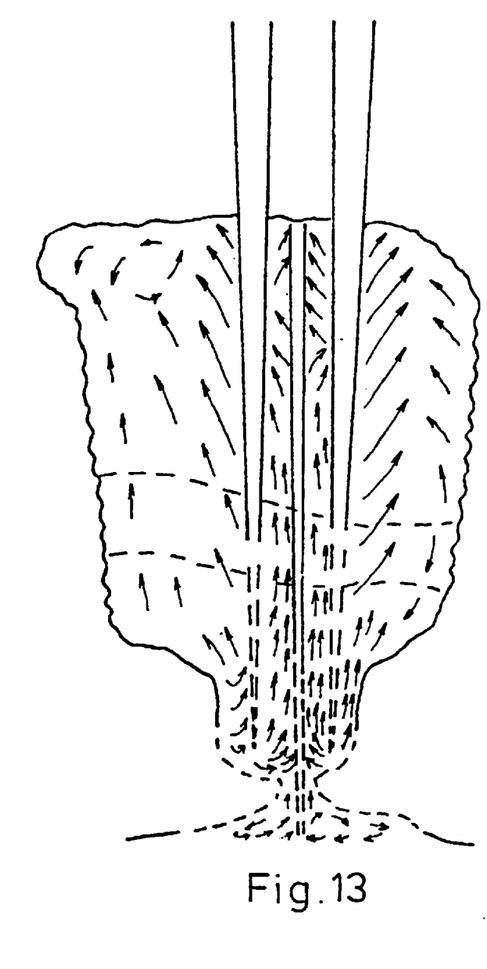
FIG. 13 shows the radiation of the tornado's out side whirl and of the storm cell containing the tornado.

During defense against the tornado according to the invention the transforming storm cells to tornado are located with heat beams collected and concentrated by the mirror system located on geostatic orbit around the Earth and with meteorological radar equipment and the heat beams collected and concentrated by the mirror system located on geostatic orbit are directed by the navigation system deployed in the space and on the Earth to the cloud's stratification of the Storm's centre and they are warmed up significantly and their dilution can be caused (FIG. 12). In the case of developed tornado with radiating the centre stratification of the tornado further the cloud mass on the fields of down stream impeding the cooling down and downward streaming of the air mass the speed of influxing air is decreasing rapidly. Equilibrium of tornado having been disrupted with this action and it can cause the dilution of clouds' mass and attenuation of the tornado can be caused as well.

Monsoons are regular seasonal wind changes in the area of the Arabic See and Indian Ocean. Phenomena's core point is that the two trade-wind bands following the sun's path make periodical movement but which is comparatively low in the area of the ocean and which is comparatively big if in the neighbourhood of the Equator extended land with large surface is located. The reason for this is that trade-wind zone warming up better above the land follows the path of the sun on better way than above the oceans and because of this it advances further on the summer half of the globe. Sufficient rains being together with summer monsoons provide the water qauantity requested to growing plantation and because of this they play important role in providing rain on enormous areas. But there are because of this extraordinary cases when the monsoon rains provide water in excess quantity as usual and their high intensity is coupled to high quantity of rain which rain quantity having dropped on certain area cases serious flooding and overflowing areas with high density population they incite disasters destroy the agricultural production of giant regions.

Figure 14:
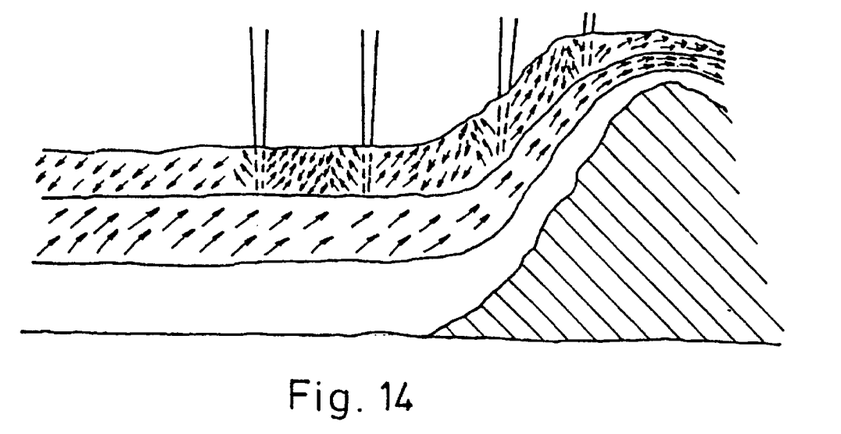
FIG. 14 shows the streaming conditions of the clouds' layers raised on the base of radiation with heat energy belonging to the moisture trade-winds on the Pacific having caused floods.
Figure 15:
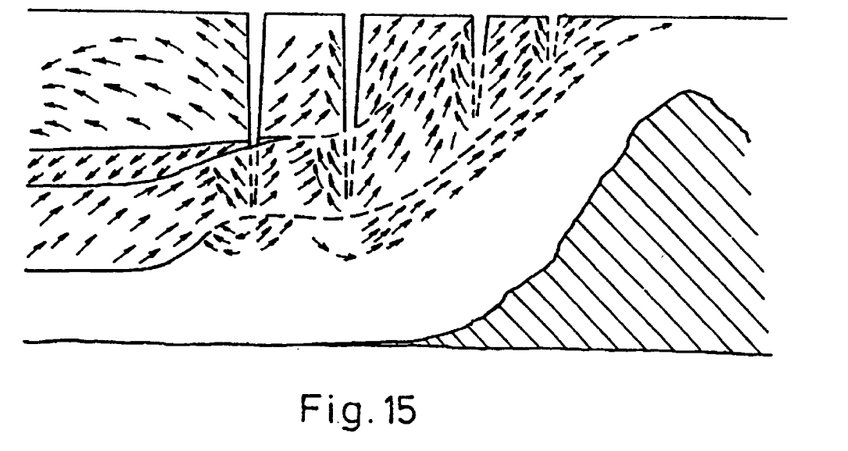
FIG. 15 shows the horizontal spreading of cloud layers radiated by heat beams.
Figure 16:
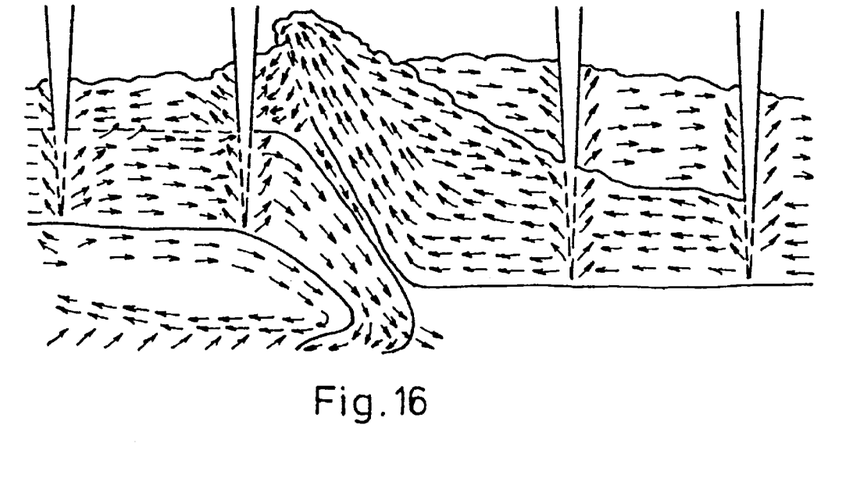
FIG. 16 shows the second phase of the horizontal spreading.
Figure 17:
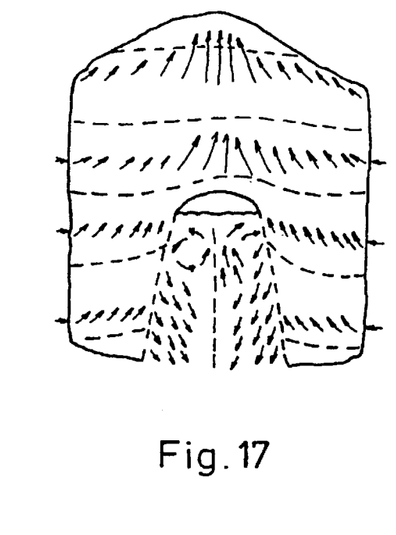
FIG. 17 shows a Cb cloud containing a hail cell.
Figures 18, 19:
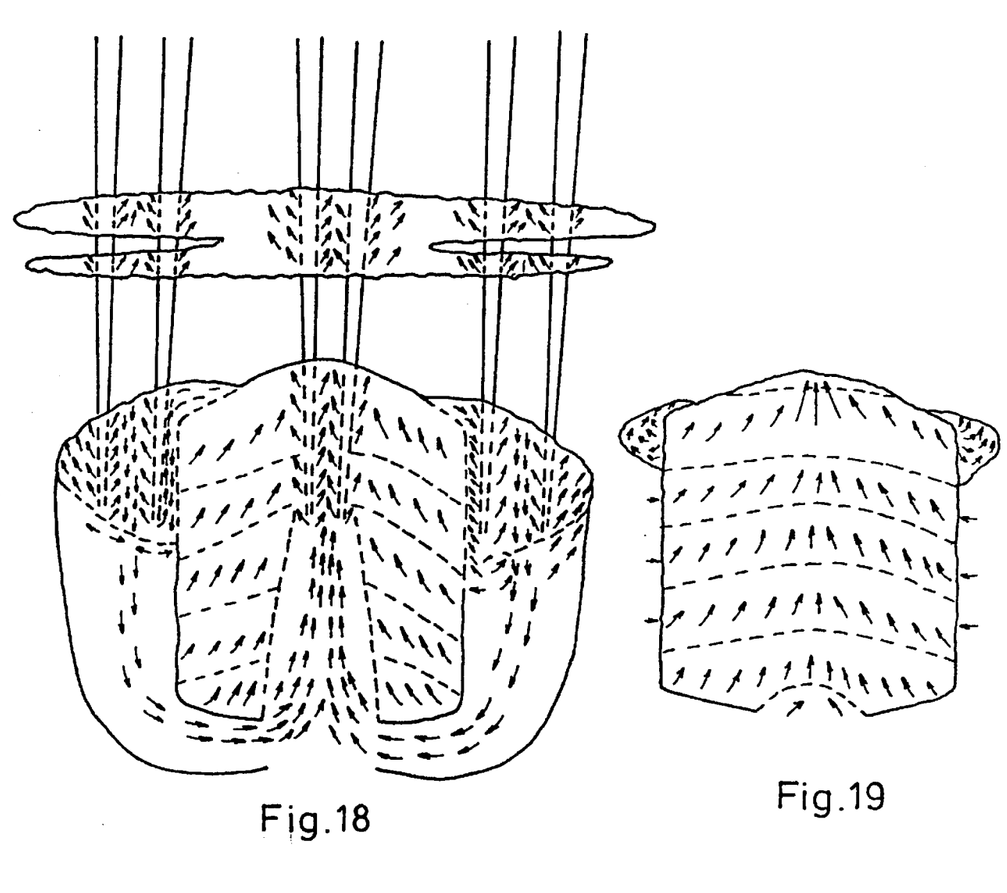
FIG. 18 shows the radiation with heat beam of the hail cell.
FIG. 19 shows the diluting clouds because of the radiation.

On FIGS. 14, 15 and 16 it is shown that how conceives the ascending enforced clouds' stratification of the moisture ocean trade-winds causing flooding radiated with heat beams the streaming conditions.

Procedure and device according to the invention start on the base of that recognition that monsoons delivering warm ocean air meet with a strong stationer front delivering cold air (China valley) or with comparatively dry upside tropospheric current to East direction (West-Africa) or hitting high mountains (West Ghats, Khas Montain and lines of the Himalaya, Indian peninsula) they are forced to ascend and it means very fruitful drop of rainfall.

When the rainfall volume is so high that it conducts to nature disaster than the cooling down of the air mass of the trade-wind forced to warm up and delivering rich rainfall are imposed with warming them up that the cloud stratification extends to vertical direction and the moisture contained by them and they distribute and drop it proportionate on larger region.

This interference is made on such a way that heat beams collected and concentrated by the mirror system located on geostatic orbit are directed to the clouds of storm cells identified previously containing air mass rich in rainfall originated from oceanic area above the zone endangered by disasters and they are warmed by with this their cooling down and their extension above the endangered area is prevented from overflowing.

During summer period (when hail is frequent) sun beams warm up significantly the surface of the soil especially there where the heat absorbtion ability is high. Overheated air mass being in instable equilibrium because of heat transferring on the soil in form of bubble departs from the surface of the soil. When the air bubble comes under lower pressure and extended on this way its temperature decreases to the point that it is not able to deliver its water contain in the form of vapour condensation commences and the bubble can be seen in the form of cloud brush. It can be seen in the case of towering cumulus that the huge bubble is composted by many smaller bubbles.

Surrounding air drifts from bigger distance into the upward stream channel of the Cumulus and with increasing of the upward stream the cumulus is getting higher and higher and storm cell is formed.

Condensation has a very important role in creation of rainfall. Condensation always happens on aerosol particles so called condensation cores in the atmosphere. There are ammonium-sulphate cores dissolaving in water and solid ones not dissolvable and mixture of these so called mixed cores. These condensing embryos are able to grow namely they are getting active in clouds overheated and more and more cooled and they form cloud drops.

Rainfall is created from the cloud elements only if drops are formed with the extension of measurement which dropping speed is enough to overcome the upward direction movements.

Falling rain drops cause the dilution of the storm cloud because the downward stream caused by them occupies larger and larger area and the supply of air is ceased.

Hail clouds are formed of storm clouds and different characteristics are shown during their development. In the surrounding of the cloud's base and peak, if the wind's speed is very different, at the edges of the cloud that type of hydrodynamical pressure distribution is developed that which creates very intensive additional upward stream on one decided side of the cloud and it creates downward stream on the other side. The wind pressure bents the axel of the upward stream channel on this way and the downward current commencing with dropping out of the rainfall does not develop inside of the upward current's channel but out side of it.

Channels of upward and downward current come near each other and a permanent circulation process is built up where the particular cloud elements travels many times on the way between the basement and the top of the cloud meanwhile they are growing continuously and breaded to huge snow flakes they leaves the basement of the cloud.

Cold air arriving from the cell in vertical direction to the soil surface is spreading in horizontal direction and it lifts the instable warm air containing high level of moisture near the storm cloud and it gives impulse enough to develop a new storm and making the process with this to be self-preserving.

The downward current does not weak the upward current in the hail cell formed gradually from the storm cell because it is located out side of the upward stream pipe and on the out side of the increasing Cb cloud a collar like form edge appears which mixes itself to the other parts of the cloud removing from the water ballast and making with it more effective the supply mechanism and it leads to strengthening the cell.

During the process the removed particles get in again into the upward current and they play on lower layers in creating ice embryos.

Second phase of hail's life cycle is followed by the cloud's icing when the created ice eye type is characterised as ice layer with thick skin mixed with air bubbles.

With increasing wide of the upward pipe and with decreasing speed of the influxing air down side it conducts to get weaker the ice making forces and ice dropping out is stopping bit-by-bit and the hail cell dies gradually.

Atmospheric ice crystals develop on two ways; once on steam deposition on other hand by freezing of over cooled water drops when the particle causing the freezing has got into the water drop during the condensing process. Both by the deposition and by the freezing so called ice embryos develop at first.

According to technical literature there is hail when ice particles developed in the cloud reach soil without melting.

Procedure and device applying for averting hail according to the invention starts on the base of that recognition that upward current in the hail cell and the supply of air on the place of the removed one happens at the base of the cloud. This influx is feeded by the influx being on out side of the Cb. At the end the assuring of this uninterrupted and continuous downward current makes it possible to ascent the air in the upward current pipe higher and to develop that level of upward current speed which causes of the developing of ice eyes with large measurement during the development of rainfall ice which causes ice damages in the form of hail.

The downward current does not weaken the upward current because it is located out of the upward current pipe further from it, namely it can be seen on the out side of the Cb (where the edge similar to the collar appears which is extended some times for the all cloud) and with blocking or decreasing heavily the downward current the hail cell's equilibrium position is changed and it is transformed to storm cell.

This enterference is done in such a way that sun beams collected and concentrated by mirror system located on geostatic orbit are focused on the cloud of downward current zone on the out side of the Cb containing hail which was identified and measured by instruments previously and warming up there the air mass rich in moisture and block partly or completely their downward current the influx is weakened on such level at the basement of the cloud that because of the intensity of the upward current decreases significantly (and the quantity of the upward streaming air) and because of this ice eyes with small dimension can develop which melt in the air with positive temperature prior getting the soil.

With that aim to impede to growing and dropping out irregular ice pieces having developed in the "older" hail sunheat beams collected and concentrated and focused by mirror system located on geostatic orbit sweeping the surface of the storm cell's upward current pipe and on the top of it the surface of the "anvil" ice pieces (ice eyes) are melted and after they are big enough for over running the lifting power drop out of the water is caused in the form of rain.

These large water drops are not able to freeze once more after weakening the upward current they falling speed is increased and they get through quickly on the air layer with low temperature.

Protection against the hail with procedure and device according to the invention is quick safe and it does not request extra cost because the mirror system located in the space with more objects any time depending on the geographical location of the endangered area independent on the countries' border can be utilizied.

I claim:

1. A device for the utilization of solar energy, comprising at least one collector disposed in a geostatic orbit, the collector comprising a collecting mirror, a projecting mirror and a concentrating mirror, and navigation means for continuously positioning the mirrors such that sunlight received by at least one of the mirrors is reflected to at least one other of the mirrors and is sent toward the earth in the form of a convergent beam.

2. A device as claimed in claim 1, wherein one said mirror receives sunlight and directs it to a second of said mirrors which in turn directs it to a third of said mirrors, said third mirror directing a convergent beam toward the earth.

3. A device as claimed in claim 1, wherein two of said mirrors receive sunlight and direct it toward a third of said mirrors, which third mirror directs sunlight in a convergent beam toward the earth.

4. A device as claimed in claim 1, wherein two of said mirrors receive sunlight, one of said mirrors directing said sunlight toward a mirror which in turn directs sunlight toward the other of said two mirrors which in turn directs sunlight toward a fourth mirror which then directs a converging beam of sunlight toward the earth.

5. A device as claimed in claim 1, wherein two of said mirrors receive sunlight and direct said sunlight toward third and fourth mirrors which in turn direct sunlight to a fifth mirror, which fifth mirror directs a convergent beam of sunlight toward the earth.

6. A device as claimed in claim 1, further including concave heat receptors for said sunlight on earth and means heated by said heat receptors to generate energy.

7. A device as claimed in claim 6, wherein said concave receptors are conical and are lined with piping in which circulates a heat exchange fluid.

8. A device as claimed in claim 7, wherein said fluid is liquid sodium.

9. A device as claimed in claim 1, wherein at least two of said mirrors are each comprised by a plurality of individual mirror units separately controlled to direct sunlight such that the sun light leaving the last of said mirrors is directed in a convergent beam toward the earth.

10. A process for dissipating storms, comprising disposing at least one mirror system in a geostatic orbit, said mirror system comprising a plurality of mirrors at least one of which comprises an array of individual mirror units computer controlled such that sunlight reflected from one of said mirrors toward another of said mirrors and thence toward the earth will be directed toward the earth in a convergent beam, and applying said convergent beam to a said storm to dissipate the storm.

\* \* \* \* \*